US012716328B1

(12) United States Patent
Alaseri et al.

(10) Patent No.: US 12,716,328 B1
(45) Date of Patent: Aug. 25, 2026

(54) CAVITATION, DISSOLVER, AND SAND INTEGRATION FOR WELLBORE DESCALING

(71) Applicant: Saudi Arabian Oil Company, Dhahran (SA)

(72) Inventors: Ghassan Adel Alaseri, Thuwal (SA); Chiara Canciani, Thuwal (SA); Ahmad Badr Alguydi, Jeddah (SA); Faisal Mohammed Alissa, Riyadh (SA); Qasim Sahu, Muntazah (SA)

(73) Assignee: Saudi Arabian Oil Company, Dhahran (SA)

( * ) Notice: Subject to any disclaimer, the term of this patent is extended or adjusted under 35 U.S.C. 154(b) by 0 days.

(21) Appl. No.: 19/297,894

(22) Filed: Aug. 12, 2025

(51) Int. Cl.

| | |
|---|---|
| ***E21B 43/34*** | (2006.01) |
| ***C09K 8/528*** | (2006.01) |
| ***C09K 8/66*** | (2006.01) |
| ***C09K 8/68*** | (2006.01) |
| ***E21B 28/00*** | (2006.01) |
| ***E21B 37/06*** | (2006.01) |

(52) U.S. Cl.
CPC .............. *E21B 37/06* (2013.01); *C09K 8/528* (2013.01); *C09K 8/665* (2013.01); *C09K 8/68* (2013.01); *E21B 28/00* (2013.01)

(58) Field of Classification Search
CPC .......... E21B 37/06; E21B 43/34; C09K 8/528
USPC .......................................................... 166/304
See application file for complete search history.

(56) References Cited

U.S. PATENT DOCUMENTS

| | | | | |
|---|---|---|---|---|
| 8,043,996 B2 * | 10/2011 | Harris | C09K 8/528 166/305.1 |
| 8,763,724 B2 * | 7/2014 | Muller | E21B 37/06 166/270.1 |
| 10,612,348 B2 * | 4/2020 | Kamler | E21B 28/00 |
| 10,711,176 B2 * | 7/2020 | Trahan | B01F 27/50 |

* cited by examiner

*Primary Examiner* — William D Hutton, Jr.
*Assistant Examiner* — Ashish K Varma
(74) *Attorney, Agent, or Firm* — Fish & Richardson P.C.

(57) ABSTRACT

A treatment fluid is flowed into a wellbore formed in a subterranean formation. The treatment fluid includes sand and a chemical dissolver configured to react with and dissolve wellbore scale. Ultrasound energy is generated within the wellbore. The generated ultrasound energy is applied to the treatment fluid, generating cavitation in the treatment fluid to facilitate dislodging of the wellbore scale. Applying the generated ultrasound energy generates vibrations in the sand, facilitating abrasive and dislodging action on the wellbore scale. The chemical dissolver is contacted with the wellbore scale, causing the chemical dissolver to react with and dissolve the wellbore scale.

17 Claims, 8 Drawing Sheets

500

Dissolution by percent: 30% Amplitude 60% Amplitude 100% Amplitude

Dissolution by grams: 30% Amplitude 60% Amplitude 100% Amplitude

700

800

CAVITATION, DISSOLVER, AND SAND INTEGRATION FOR WELLBORE DESCALING

TECHNICAL FIELD

This disclosure relates to scale removal, and in particular, wellbore scale management.

BACKGROUND

During hydrocarbon extraction, scale can form on the walls of tubulars and/or downhole equipment installed in wells. Scale is a deposit or coating formed on a surface of a metal, rock, or other material. Formation and accumulation of scale can be caused by precipitation due to chemical reaction (e.g., with the surface), a change in pressure or temperature, or a change in the composition of a solution. The scale can plug or damage well equipment, which can potentially cause a catastrophic failure of a piece of equipment, such as an electric submersible pump, as it pumps well fluid uphole. Equipment failure can negatively impact production and can increase field asset operating costs. Taking measures to preserve and extend the life of well equipment is favorable to keep production economical.

SUMMARY

This specification describes technologies relating to wellbore scale management. The described methods, compositions, and systems can significantly enhance efficiency of descaling operations by inducing localized erosion, increasing surface exposure, and compromising the mechanical integrity of scale deposits, making such scale deposits easier to handle and remove. The described methods and systems implement ultrasonic cavitation to generate localized cavitation effects combined with chemical dissolvers and sand, which both work synergistically with the ultrasonic cavitation to dislodge, break up, and dissolve wellbore scale. The sand can function similarly as a proppant to maintain and widen fractures within the wellbore scale, thereby increasing the surface area of channels to interact with the chemical dissolver, improving both the mechanical and chemical descaling effects of the described methods and systems. The described methods and systems can be implemented near wellbore stimulation operations for eroding the surface area of the wellbore open hole section and dissolve debris, thereby enhancing permeability and porosity of the formation for improving production from the well.

The details of one or more implementations of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

This disclosure describes wellbore scale removal. Scale formation, particularly with sulfate scales that are insoluble and resistant to acid dissolution, poses significant challenges in oilfield applications. Traditional descaling methods, such as chemical soaking, mechanical removal, and acid washes, are often time-consuming and invasive. Ultrasonic cavitation technology, which uses soundwaves (above 20 kilohertz (kHz)), shows promising results in enhancing scale removal.

The described treatment combines ultrasonic cavitation with chemical dissolver and silica sand to provide a comprehensive descaling method. Ultrasonic waves can generate regions of low pressure in the wellbore fluid, leading to the formation and subsequent collapse of vapor bubbles, which locally produce high temperature and pressure, resulting in liquid jets near solid surfaces. Imperfections in solid surfaces (which are common in wellbore scale) can serve as nucleation sites for cavitation bubble formation. The addition of sand further improves the descaling process by introducing abrasive action that synergizes with cavitation forces. Further, the sand particles can also act as proppants within fractures in subterranean formations by maintaining fracture openings and widening fracture openings, which can compromise the mechanical integrity of wellbore scale and facilitate removal of such scale.

Figure 1:
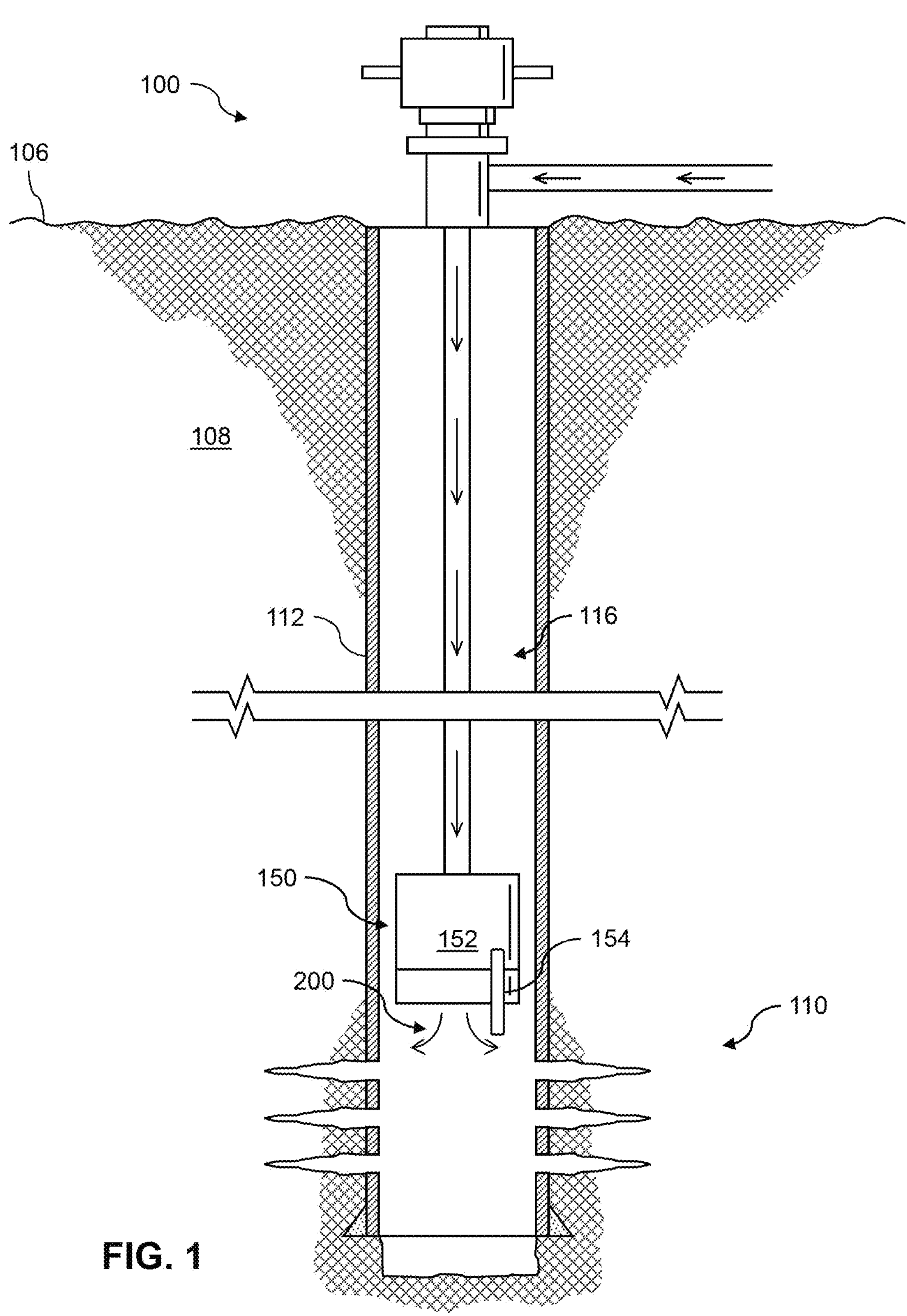
FIG. 1 is a schematic diagram of an example well.

FIG. 1 depicts an example well 100 constructed in accordance with the concepts herein. The well 100 extends from the surface 106 through the Earth 108 to one more subterranean zones of interest 110 (one shown). The well 100 enables access to the subterranean zones of interest 110 to allow recovery (that is, production) of fluids to the surface 106 and, in some implementations, additionally or alternatively allows fluids to be placed in the Earth 108. In some implementations, the subterranean zone 110 is a formation within the Earth 108 defining a reservoir, but in other instances, the zone 110 can be multiple formations or a portion of a formation. The subterranean zone can include, for example, a formation, a portion of a formation, or multiple formations in a hydrocarbon-bearing reservoir from which recovery operations can be practiced to recover trapped hydrocarbons. In some implementations, the subterranean zone includes an underground formation of naturally fractured or porous rock containing hydrocarbons (for example, oil, gas, or both). In some implementations, the well can intersect other types of formations, including reservoirs that are not naturally fractured. For simplicity's sake, the well 100 is shown as a vertical well, but in other instances, the well 100 can be a deviated well with a wellbore deviated from vertical (for example, horizontal or slanted), the well 100 can include multiple bores forming a multilateral well (that is, a well having multiple lateral wells branching off another well or wells), or both.

In some implementations, the well 100 is a gas well that is used in producing hydrocarbon gas (such as natural gas) from the subterranean zones of interest 110 to the surface 106. While termed a "gas well," the well need not produce only dry gas, and may incidentally or in much smaller quantities, produce liquid including oil, water, or both. In some implementations, the well 100 is an oil well that is used in producing hydrocarbon liquid (such as crude oil) from the subterranean zones of interest 110 to the surface 106. While termed an "oil well," the well not need produce only hydrocarbon liquid, and may incidentally or in much smaller quantities, produce gas, water, or both. In some implementations, the production from the well 100 can be multiphase in any ratio. In some implementations, the production from the well 100 can produce mostly or entirely liquid at certain times and mostly or entirely gas at other times. For example, in certain types of wells it is common to produce water for a period of time to gain access to the gas in the subterranean zone. The concepts herein, though, are not limited in applicability to gas wells, oil wells, or even production wells, and could be used in wells for producing other gas or liquid resources or could be used in injection wells, disposal wells, or other types of wells used in placing fluids into the Earth.

The wellbore of the well 100 is typically, although not necessarily, cylindrical. All or a portion of the wellbore is lined with a tubing, such as casing 112. The casing 112 connects with a wellhead at the surface 106 and extends downhole into the wellbore. The casing 112 operates to isolate the bore of the well 100, defined in the cased portion of the well 100 by the inner bore 116 of the casing 112, from the surrounding Earth 108. The casing 112 can be formed of a single continuous tubing or multiple lengths of tubing joined (for example, threadedly) end-to-end. In FIG. 1, the casing 112 is perforated in the subterranean zone of interest 110 to allow fluid communication between the subterranean zone of interest 110 and the bore 116 of the casing 112. In some implementations, the casing 112 is omitted or ceases in the region of the subterranean zone of interest 110. This portion of the well 100 without casing is often referred to as "open hole."

The wellhead defines an attachment point for other equipment to be attached to the well 100. For example, FIG. 1 shows well 100 being produced with a Christmas tree attached to the wellhead. The Christmas tree includes valves used to regulate flow into or out of the well 100. The well 100 also includes an apparatus 150 residing in the wellbore, for example, at a depth that is nearer to subterranean zone 110 than the surface 106. The apparatus 150, being of a type configured in size and robust construction for installation within a well 100, can include any type of rotating equipment that can assist production of fluids to the surface 106 and out of the well 100 by creating an additional pressure differential within the well 100. For example, the apparatus 150 can include a pump, compressor, blower, or multiphase fluid flow aid.

In particular, casing 112 is commercially produced in a number of common sizes specified by the American Petroleum Institute (the "API"), including 4½ inches (in) (11.4 centimeters (cm)), 5 in (12.7 cm), 5½ in (14 cm), 6 in (15.2 cm), 6⅝ in (16.8 cm), 7 in (17.8 cm), 7⅝ in (19.4 cm), 7¾ in (19.7 cm), 8⅝ in (21.9 cm), 8¾ in (22.2 cm), 9⅝ in (24.4 cm), 9¾ in (24.8 cm), 9⅞ in (25.1 cm), 10¾ in (27.3 cm), 11¾ in (29.8 cm), 11⅞ in (30.2 cm), 13⅜ in (34 cm), 13½ in (34.3 cm), 13⅝ in (34.6 cm), 16 in (40.6 cm), 18⅝ in (47.3 cm), and 20 in (50.8 cm), and the API specifies internal diameters for each casing size. The apparatus 150 can be configured to fit in, and (as discussed in more detail below) in certain instances, scrape against the inner diameter of one of the specified API casing sizes. Of course, the apparatus 150 can be made to fit in and, in certain instances, scrape against other sizes of casing or tubing or otherwise scrape a wall of the well 100. In some implementations, the casing 112 is omitted or ceases in the region of the subterranean zone of interest 110. This portion of the well 100 without casing is often referred to as "open hole."

In some cases, scale and/or debris accumulate in the well 100, for example, on the wall(s) of tubulars disposed in the wellbore. For example, wellbore scale can accumulate on a surface of the casing 112 or a production tubing. In some cases, wellbore scale can accumulate on downhole equipment deployed in the well 100. An apparatus 150 can be deployed in the well 100 to provide sonication within the well 100 to facilitate scale dissolution and/or removal. A treatment fluid 200 can be flowed into the well 100 to facilitate scale dissolution and/or removal. The combination of the apparatus 150 providing sonication and the introduction of the treatment fluid 200 into the well 100 can dissolve and/or remove scale that is present in the well 100. The combination of the apparatus 150 providing sonication and the introduction of the treatment fluid 200 into the well 100 can mechanically break apart and/or dislodge scale and chemically dissolve the scale to remove the scale from surface(s) within the wellbore.

Figure 2:
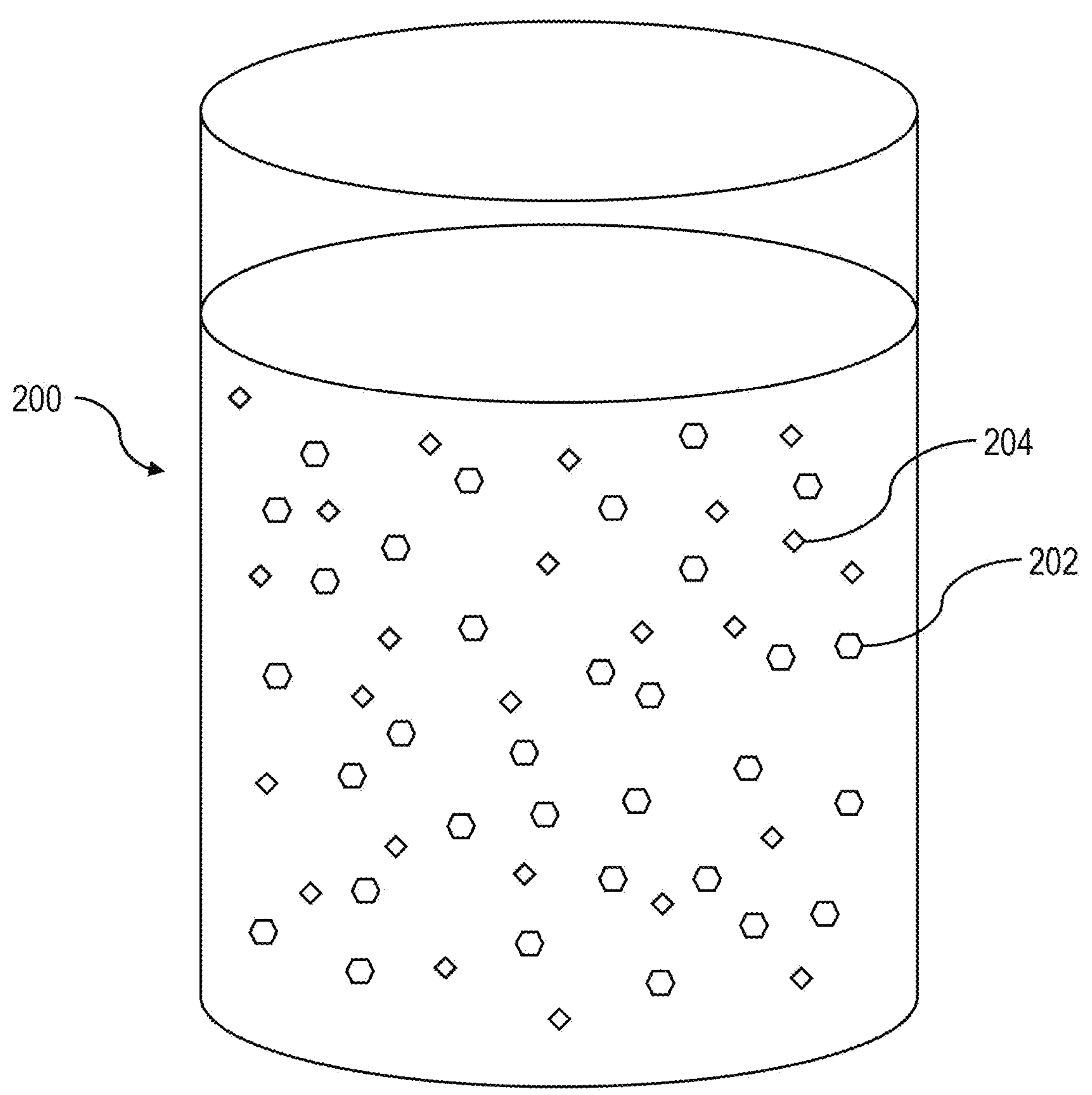
FIG. 2 is a schematic diagram of an example treatment fluid that can be used in the well of FIG. 1.

The apparatus 150 includes a pump 152 and an ultrasonic probe 154. The pump 152 is configured to flow the treatment fluid 200 into the wellbore. The ultrasonic probe 154 is configured to generate ultrasound energy within the wellbore to produce vibrations in the treatment fluid 200 to provide abrasive and dislodging action on wellbore scale. As shown in FIG. 2 and described in more detail later, the treatment fluid 200 includes sand 202 and a chemical dissolver 204. Referring back to FIG. 1, the ultrasonic probe 154 generates ultrasound energy to generate cavitation and vibrations in the sand 202 of the treatment fluid 200, thereby facilitating abrasive and dislodging action on the wellbore scale.

In some implementations, the ultrasonic probe 154 is configured to generate ultrasound energy at a specified frequency that generates cavitation in the treatment fluid 200 to facilitate the abrasive and dislodging action of the treatment fluid 200 on the wellbore scale. Cavitation occurs when rapid changes in fluid pressure cause the formation and collapse of vapor bubbles within a liquid. Cavitation can lead to intense shockwaves as the bubbles collapse, impacting nearby surfaces, such as the wellbore scale. Cavitation can facilitate dislodging of the wellbore scale from surfaces of the well 100 (e.g., wellbore wall and/or inner surfaces of tubing disposed within the well 100). Cavitation can generate fractures in the wellbore scale to increase an exposed surface area of the wellbore scale. The increased surface area of the wellbore scale that is exposed to the treatment fluid 200 can facilitate contact of the chemical dissolver 204 of the treatment fluid 202 to react with and dissolve the wellbore scale. In some implementations, the specified frequency at which the ultrasonic probe 154 generates the ultrasound energy is greater than about 20 kilohertz (kHz) to generate cavitation in the treatment fluid 200. In some implementations, the specified frequency at which the ultrasonic probe 154 generates the ultrasound energy is less than about 40 kHz to generate cavitation in the treatment fluid 200. For example, the specified frequency at which the ultrasonic probe 154 generates the ultrasound energy is in a range from about 20 kHz to about 40 kHz to generate cavitation in the treatment fluid 200. In some implementations, the sand 202 of the treatment fluid 200 can act as a proppant to maintain and/or widen the fractures generated in the wellbore scale to facilitate contact of the chemical dissolver 204 with the wellbore scale. In some implementations, the sand 202 has an average particle size in a range from about 60 micrometers to about 0.5 millimeters.

FIG. 2 is a schematic diagram of an example treatment fluid 200 that can be used in the well 100 of FIG. 1. As described previously and shown in FIG. 2, the treatment fluid 200 includes sand 202 and a chemical dissolver 204. The sand 202 can be a granular material including mineral particles, such as silicon dioxide ($SiO_2$). The size of the particles of sand 202 included in the treatment fluid 200 can be selected, such that the sand 202 can prop open any generated fractures in the wellbore scale for increasing the exposed surface area of the wellbore scale and facilitating contact of the chemical dissolver 204 with the wellbore scale. In some cases, the sand 202 can widen generated fractures in the wellbore scale. The chemical dissolver 204 can be selected based on the expected (or known) composition of the wellbore scale. For example, the chemical dissolver 204 can be selected based on its dissolution ability of the wellbore scale that is to be removed from the well 100. In some implementations, the chemical dissolver 204 includes a chelating agent. For example, the chemical dissolver 204 includes tetrasodium ethylenediamine tetraacetic acid (EDTA). In some implementations, the chemical dissolver 204 includes an inorganic compound. For example, the chemical dissolver 204 includes potassium carbonate. The sand 202 and the chemical dissolver 204 of the treatment fluid 200 in conjunction with the ultrasonic cavitation can be used to efficiently remove wellbore scale from the well 100. In some implementations, the sand 202 and the chemical dissolver 204 are mixed with a carrier fluid. The carrier fluid can include, for example, water. For example, the carrier fluid can include deionized water or produced water, which can include hydrocarbons, salts, and other organic and inorganic compounds. In some implementations, the treatment fluid 200 includes from about 3 weight percent (wt. %) to about 20 wt. % of the sand 202. In some implementations, the treatment fluid 200 includes from about 5 wt. % to about 25 wt. % of the chemical dissolver 204.

Figure 3:
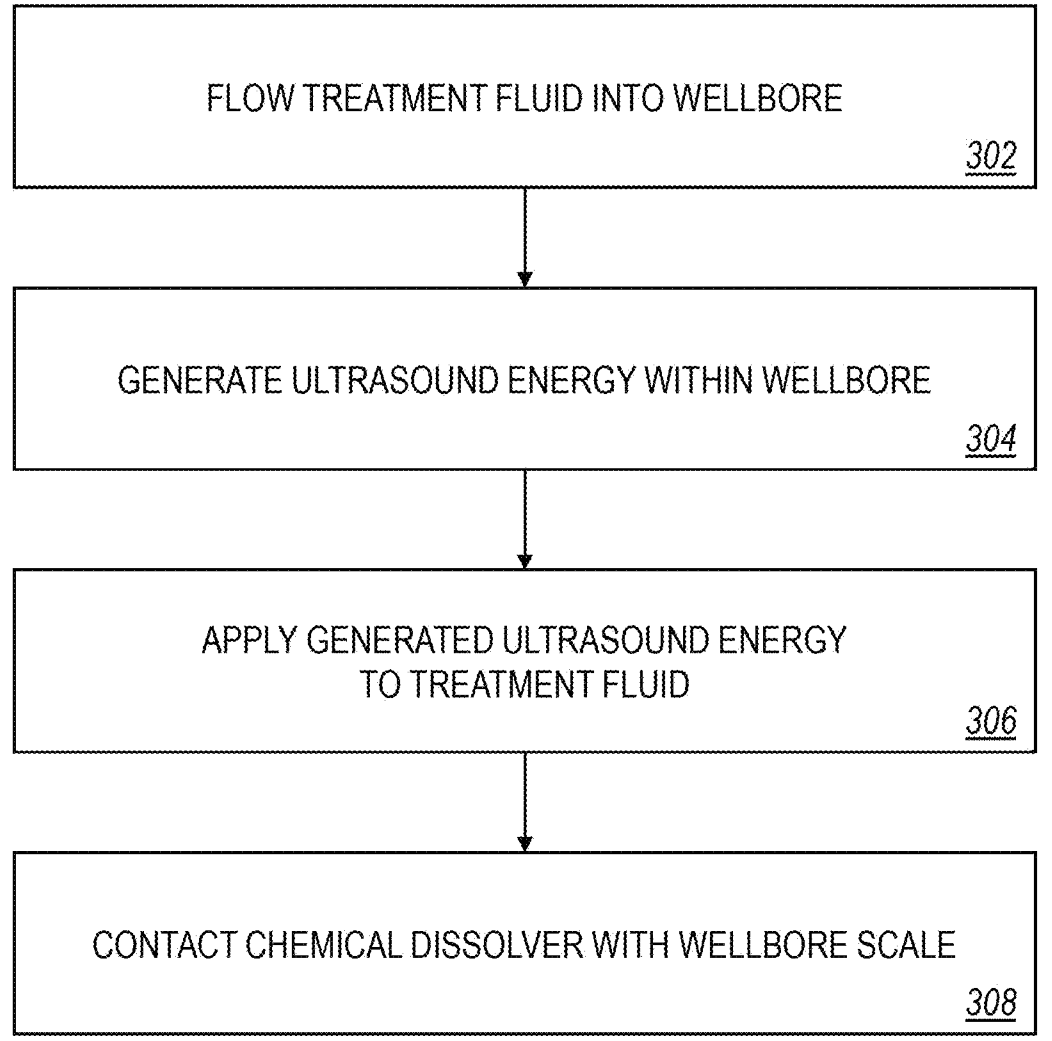
FIG. 3 is a flow chart of an example method for treating the well of FIG. 1.

FIG. 3 is a flow chart of an example method 300 for treating the well 100 of FIG. 1. The apparatus 150 shown in FIG. 1 can, for example, be used to implement the method 300. At block 302, a treatment fluid (such as the treatment fluid 200) is flowed into a wellbore formed in a subterranean formation (such as the wellbore of the well 100). As described previously, the treatment fluid 200 includes sand 202 and the chemical dissolver 204, which is configured to react with and dissolve wellbore scale. At block 304, ultrasound energy is generated within the wellbore of the well 100. At block 306, the ultrasound energy generated at block 304 is applied to the treatment fluid 200. Applying the generated ultrasound energy at block 306 generates cavitation in the treatment fluid 200 to facilitate dislodging action of the treatment fluid 200 on the wellbore scale. Applying the generated ultrasound energy at block 306 generates vibrations in the sand 202 of the treatment fluid 200 flowed into the wellbore at block 302. The vibrations in the sand 202 provide abrasive and dislodging action on the wellbore scale. At block 308, the chemical dissolver 204 of the treatment fluid 200 is contacted with the wellbore scale for a specified time duration, causing the chemical dissolver 204 to react with and dissolve the wellbore scale within the wellbore. In some implementations, the specified time duration at block 308 is at least one hour (for example, about one to about 2 hours, about one to about three hours, about one to about four hours, about one to about five hours, or about one to about six hours).

In some implementations, the ultrasound energy generated at block 304 is generated at a specified frequency that generates cavitation in the treatment fluid 200 (block 306) to facilitate the dislodging action of the treatment fluid 200 on the wellbore scale. In some implementations, the ultrasound energy generated at block 304 has a frequency of greater than about 20 kHz to generate the cavitation in the treatment fluid. The cavitation can dislodge the wellbore scale from a surface, break apart the wellbore scale, generate fracture(s) in the wellbore scale, or any combinations of these. In addition to the cavitation, the sand 202 which is agitated by the ultrasound energy generated at block 304 can facilitate dislodging the wellbore scale from a surface, breaking apart the wellbore scale, generating fracture(s) in the wellbore scale, or any combinations of these. The inclusion of sand 202 in the treatment fluid 200 along with the generation of ultrasound energy work synergistically with the chemical dissolver 204 to break apart and dissolve the wellbore scale within the wellbore. Breaking apart the wellbore scale can increase an exposed surface area of the wellbore scale, allowing more surface area of the wellbore scale to come in contact with the chemical dissolver 204 at block 308. Generating fractures in the wellbore scale can increase the exposed surface area of the wellbore scale, allowing more surface of the wellbore scale to come into contact with the chemical dissolver 204 at block 308. In some implementations, the sand 202 maintains the generated fractures in the wellbore scale to facilitate contact of the chemical dissolver 204 with the wellbore scale. In some implementations, the sand 202 widens the generated fractures in the wellbore scale to facilitate contact of the chemical dissolver 204 with the wellbore scale.

Figure 4:
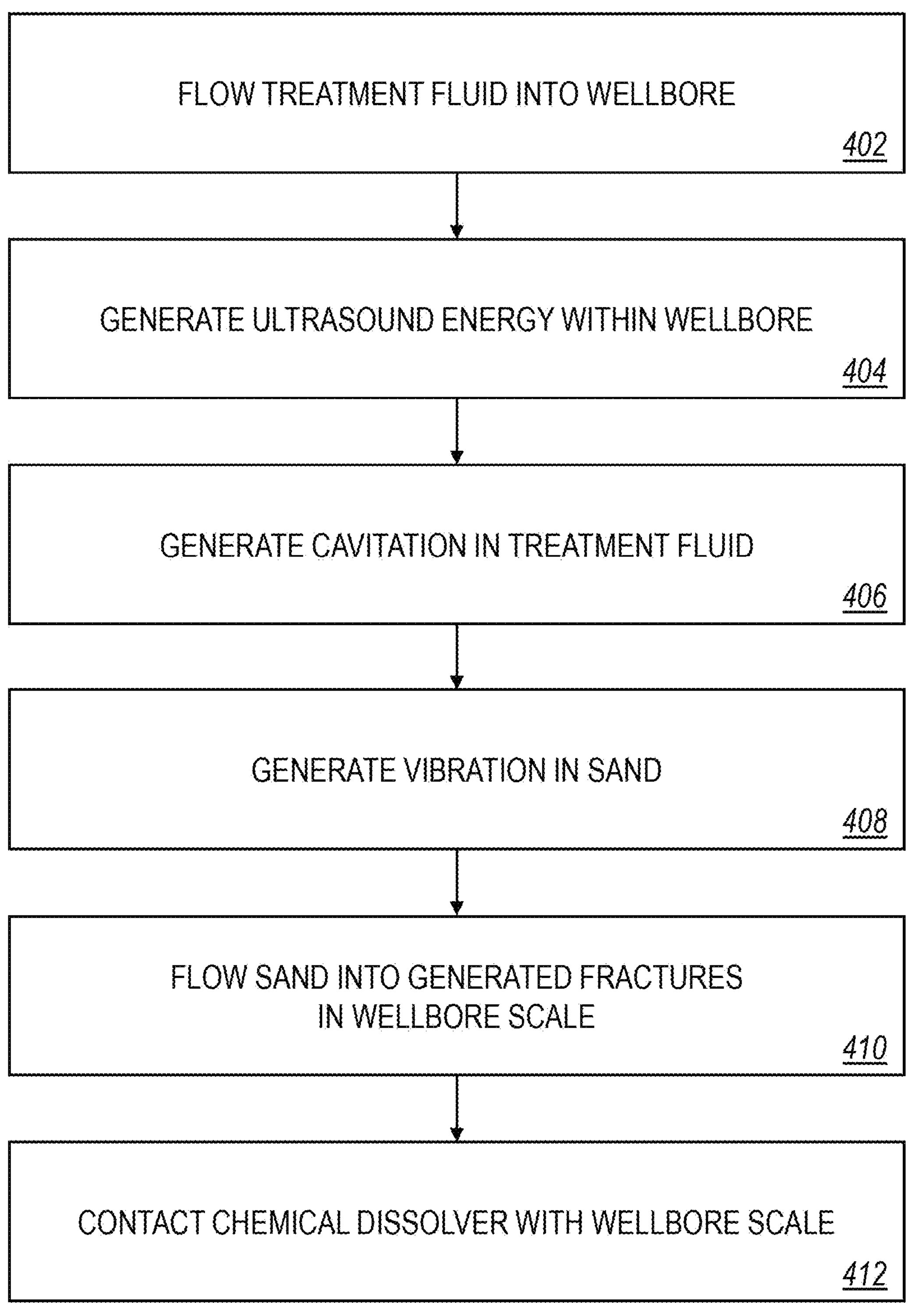
FIG. 4 is a flow chart of an example method for treating the well of FIG. 1.

FIG. 4 is a flow chart of an example method 400 for treating the well 100 of FIG. 1. The apparatus 150 shown in FIG. 1 can, for example, be used to implement the method 400. At block 402, a treatment fluid (such as the treatment fluid 200) is flowed into a wellbore formed in a subterranean formation (such as the wellbore of the well 100). In this particular example method 400, the treatment fluid 200 includes sand 202 and potassium carbonate as the chemical dissolver 204. At block 404, ultrasound energy is generated within the wellbore of the well 100. In some implementations, the ultrasound energy generated at block 404 is generated at a specified frequency of greater than 20 kHz. At block 406, cavitation is generated in the treatment fluid 200 in response to generating the ultrasound energy within the wellbore at block 404 to facilitate generation of fractures in the wellbore scale and dislodging the wellbore scale. At block 408, vibrations are generated in the sand 202 of the treatment fluid 200 in response to generating the ultrasound energy within the wellbore at block 404 to facilitate abrasive and dislodging action on the wellbore scale. The cavitation generated at block 406 and the vibrations generated in the sand 202 at block 408 generates fractures in the wellbore scale. At block 410, the sand 202 is flowed into the generated fractures in the wellbore scale to hold open the generated fractures and increase an exposed surface area of the wellbore scale to facilitate contact of the potassium carbonate with the wellbore scale. In some implementations, the generated fractures in the wellbore scale are widened in response to generating the vibrations in the sand 202 at block 408 to facilitate contact of the chemical dissolver 204 with the wellbore scale. At block 412, the potassium carbonate is contacted with the wellbore scale for a specified time duration, causing the potassium carbonate to react with and dissolve the wellbore scale within the wellbore of the well 100. In some implementations, the specified time duration at block 412 is at least one hour.

EXAMPLES

Figure 5:
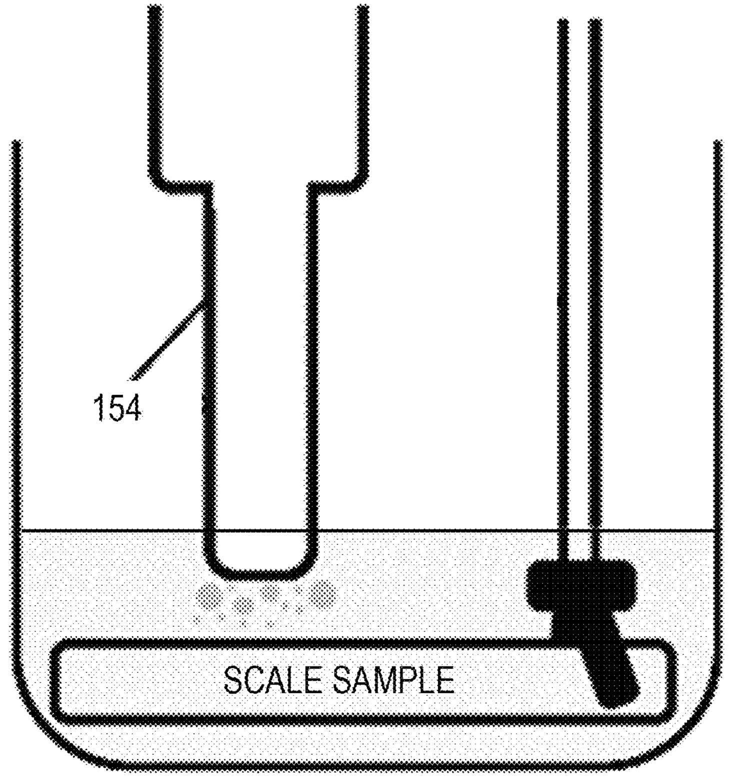
FIG. 5 is a schematic diagram of an experimental setup for testing an example treatment fluid.

FIG. 5 is a schematic diagram of an experimental setup 500 for testing an example treatment fluid, such as the treatment fluid 200. The setup 500 included a 1-liter beaker holding a volume of water and a scale sample held submerged in the treatment fluid 200. The setup 500 included an ultrasonic probe 154 that was at least partially submerged in the water. The setup 500 was used as a control experiment to test the effect of ultrasonic cavitation alone, without the use of the treatment fluid 200 (including the sand 202 and the chemical dissolver 204).

Figure 6:
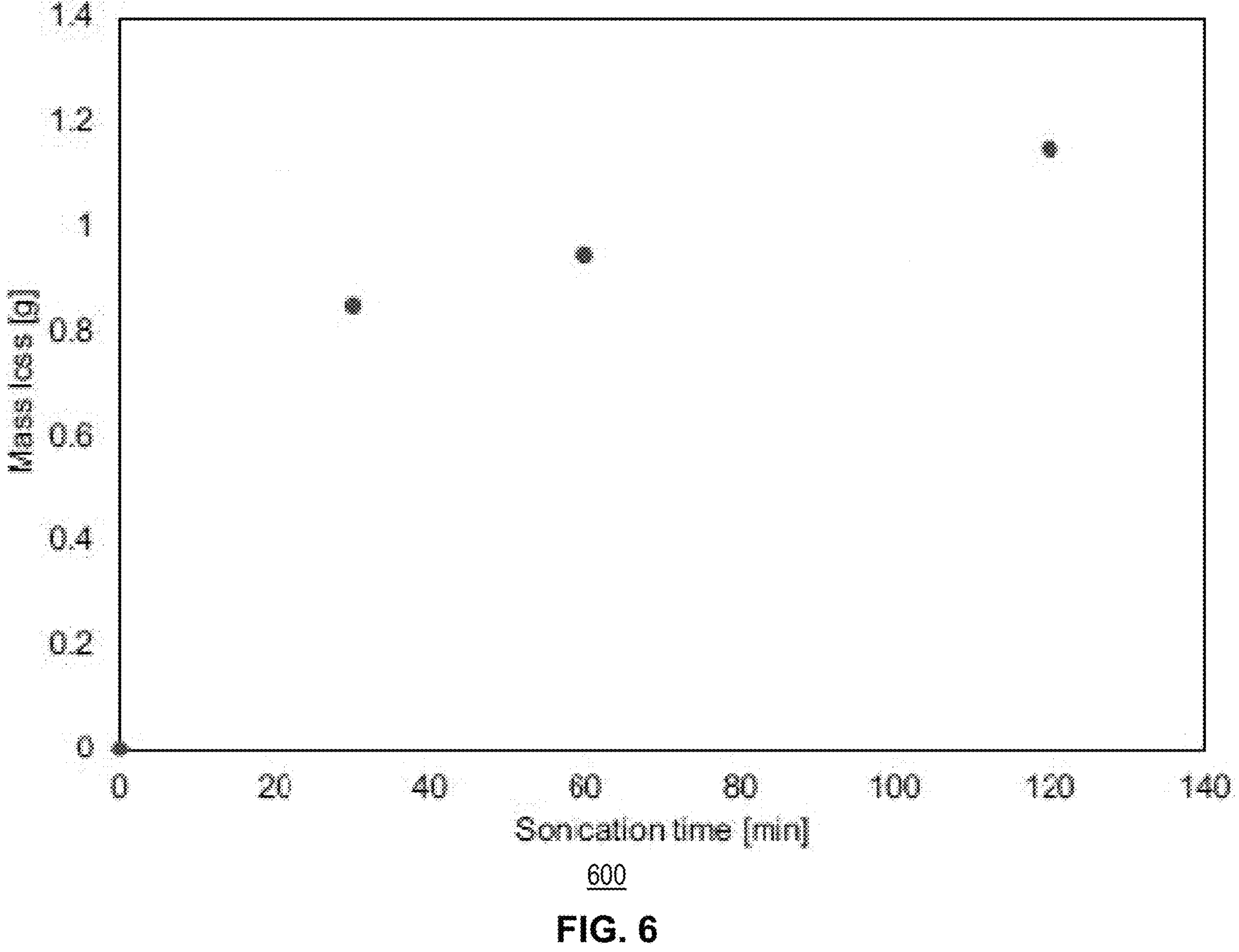
FIG. 6 is a plot showing loss of mass of a scale sample over time.

FIG. 6 is a plot 600 showing loss of mass of the scale sample over time. Plot 600 shows the results of the control experiment with the setup 500. As shown in plot 600 of FIG. 6, after two hours, a little more than one gram (less than 1.2 grams) of mass loss of the scale sample was observed due to cavitation alone.

The setup 500 was then altered to test the efficacy of inclusion of a chemical dissolver without ultrasonic cavitation and then with ultrasonic cavitation. In a first experiment, a scale sample was soaked in tetrasodium EDTA alone without ultrasonic cavitation for two hours, which resulted in dissolution of 18% of the scale sample (gypsum). In a second experiment, a scale sample was soaked in tetrasodium EDTA with ultrasonic cavitation. With ultrasonic cavitation, 47% dissolution and 54% dissolution of the scale sample was observed after one hour and after two hours, respectively. In the second experiment, the dissolution was observed to be localized, leading to pronounced notches and weakened mechanical properties of the scale sample. In a third experiment, a scale sample was soaked in potassium carbonate alone without ultrasonic cavitation for two hours, which resulted in dissolution of 4% of the scale sample (gypsum). In a fourth experiment, a scale sample was soaked in potassium carbonate with ultrasonic cavitation. With ultrasonic cavitation, 33% and 48% dissolution of the scale sample was observed after two hours and after four hours, respectively. In the fourth experiment, dissolution of the scale sample with potassium carbonate with ultrasonic cavitation caused extensive localized erosion to the point that the scale sample lost its mechanical integrity and fractured after two hours.

Figure 7:
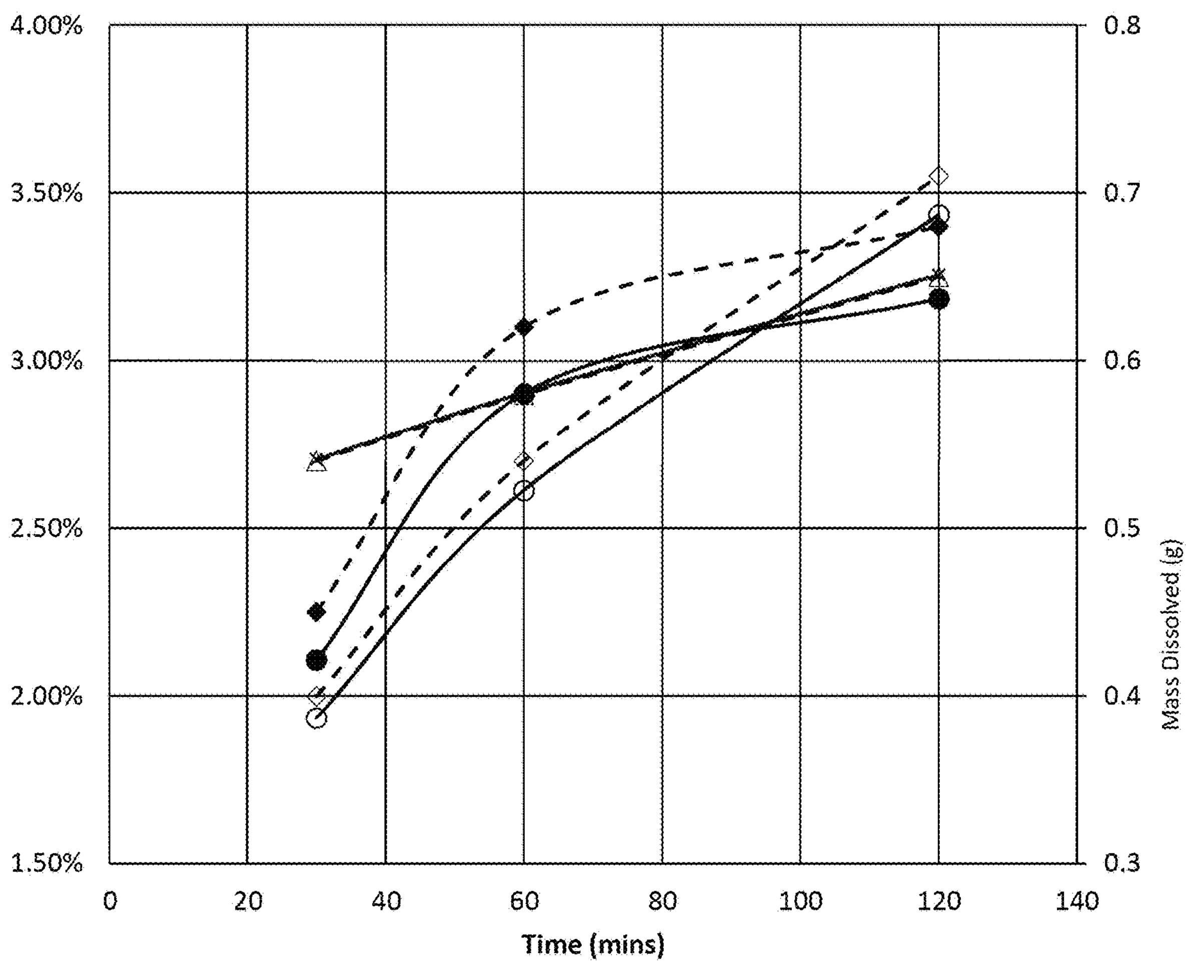
FIG. 7 is a plot showing loss of mass of scale samples over time for various ultrasonication amplitudes.

The setup 500 was then altered to test the efficacy of including sand at varying intensities of ultrasonic cavitation. The fluids tested included 400 milliliters of synthetic produced water and 30 grams of sand. The ultrasonic probe 154 was operated at 28 kHz at adjustable amplitudes (30%, 60%, and 100%). FIG. 7 is a plot 700 showing loss of mass of scale samples over time for various ultrasonication amplitudes. In plot 700 of FIG. 7, the data connected by solid lines show dissolution by percent (left y-axis), while the data connected by dotted lines show mass dissolution in grams (right y-axis).

Figure 8:
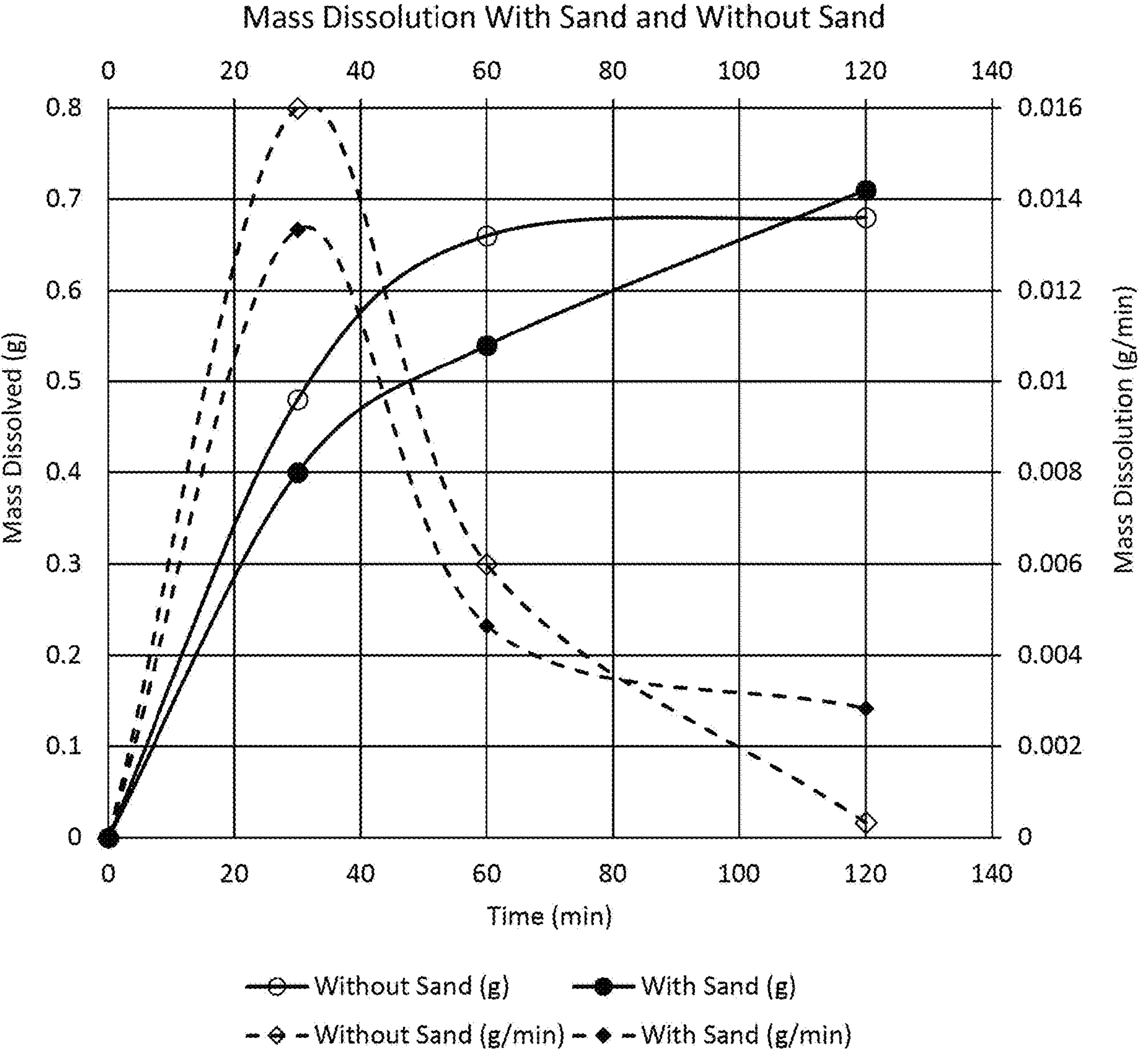
FIG. 8 is a plot showing loss of mass of scale samples over time using treatment fluids including and excluding sand.

The setup 500 was then altered to test the efficacy of including and excluding sand at a set intensity of ultrasonic cavitation. All of the fluids tested included 400 milliliters of synthetic produced water. The control fluids included no sand (control), while the test fluids included 30 grams of silicon dioxide sand. Comparative trials at 60% amplitude for the control fluid (excluding sand) and test fluid (including sand) showed that while mass dissolution was similar, the dissolution rate for the test fluid (including sand) was approximately ten times greater after 120 minutes. FIG. 8 is a plot 800 showing loss of mass of scale samples over time using treatment fluids including and excluding sand. In plot 800 of FIG. 8, the data connected by solid lines show mass dissolution in grams (left y-axis), while the data connected by dotted lines show mass dissolution in grams per minute (right y-axis). The results in plot 800 indicate that inclusion of sand contributes to increased surface area exposure and mechanical damage due to abrasive action. Samples subjected to ultrasonic cavitation with sand exhibited severe erosion and fragmentation, with sand particles embedded deep within fractures and acting as proppants that facilitated fracture propagation and widening.

Certain aspects of the subject matter described here can be implemented as a method. The method comprises flowing a treatment fluid into a wellbore formed in a subterranean formation. The treatment fluid comprises sand and a chemical dissolver configured to react with and dissolve wellbore scale. The method comprises generating ultrasound energy within the wellbore. The method comprises applying the generated ultrasound energy to the treatment fluid. Applying the generated ultrasound energy generates cavitation in the treatment fluid to facilitate dislodging of the wellbore scale. Applying the generated ultrasound energy generates vibrations in the sand of the treatment fluid flowed into the wellbore. The vibrations in the sand facilitate abrasive and dislodging action on the wellbore scale. The method comprises contacting the chemical dissolver with the wellbore scale for a specified time duration causing the chemical dissolver to react with and dissolve the wellbore scale within the wellbore.

An aspect combinable with any other aspect can include the following features. In some implementations, prior to flowing the treatment fluid into the wellbore, the wellbore scale is disposed on a surface of a tubular disposed within the wellbore, and the wellbore scale is removed from the surface of the tubular in response to flowing the treatment fluid into the wellbore, generating the ultrasound energy, applying the generated ultrasound energy to the treatment fluid, and contacting the chemical dissolver with the wellbore scale. In some implementations, the generated ultrasound energy has a frequency of greater than about 20 kilohertz (kHz) to generate the cavitation in the treatment fluid. In some implementations, the method comprises generating fractures in the wellbore scale in response to generating the cavitation in the treatment fluid to increase an exposed surface area of the wellbore scale. In some implementations, the method comprises flowing the sand into the generated fractures in the wellbore scale to hold open the generated fractures and facilitate contact of the chemical dissolver with the wellbore scale. In some implementations, the method comprises widening the generated fractures in the wellbore scale in response to generating vibrations in the sand of the treatment fluid. In some implementations, the chemical dissolver comprises a chelating agent. In some implementations, the chelating agent comprises ethylenediamine tetraacetic acid. In some implementations, the chemical dissolver comprises an inorganic compound. In some implementations, the inorganic compound comprises potassium carbonate.

Certain aspects of the subject matter described here can be implemented as a system. The system comprises a treatment fluid comprising sand and a chemical dissolver configured to react with and dissolve wellbore scale. The system comprises a pump configured to flow the treatment fluid into a wellbore formed in a subterranean formation. The system comprises an ultrasonic probe configured to generate ultrasound energy within the wellbore to generate cavitation in the treatment fluid to facilitate dislodging action on the wellbore scale and to generate vibrations in the sand of the treatment fluid to provide abrasive and dislodging action on the wellbore scale.

An aspect combinable with any other aspect can include the following features. In some implementations, the system comprises a tubular disposed within a wellbore, wherein the wellbore scale is disposed on a surface of the tubular. In some implementations, the treatment fluid and the ultrasonic probe are cooperatively configured to remove the wellbore scale from the surface of the tubular. In some implementations, the ultrasonic probe is configured to generate the ultrasound energy at a specified frequency that generates cavitation in the treatment fluid, and the specified frequency is greater than about 20 kilohertz (kHz). In some implementations, the chemical dissolver comprises ethylenediamine tetraacetic acid. In some implementations, the chemical dissolver comprises potassium carbonate. In some implementations, the sand is sized to hold open fractures within the wellbore scale for facilitating contact of the chemical dissolver with the wellbore scale.

Certain aspects of the subject matter described here can be implemented as a method. The method comprises flowing a treatment fluid into a wellbore formed in a subterranean formation. The treatment fluid comprises sand and potassium carbonate configured to react with and dissolve wellbore scale. The method comprises generating ultrasound energy within the wellbore. The method comprises generating cavitation in the treatment fluid in response to generating the ultrasound energy within the wellbore to facilitate generation of fractures in the wellbore scale and dislodging the wellbore scale. The method comprises generating vibrations in the sand of the treatment fluid in response to generating the ultrasound energy within the wellbore to facilitate abrasive and dislodging action on the wellbore scale. The method comprises flowing the sand into the generated fractures in the wellbore scale to hold open the generated fractures and increase an exposed surface area of the wellbore scale to facilitate contact of the potassium carbonate with the wellbore scale. The method comprises contacting the potassium carbonate with the wellbore scale for a specified time duration causing the potassium carbonate to react with and dissolve the wellbore scale within the wellbore.

An aspect combinable with any other aspect can include the following features. In some implementations, the ultrasound energy is generated at a specified frequency of greater than 20 kilohertz (kHz) that generates the cavitation in the treatment fluid to facilitate the abrasive and dislodging action of the treatment fluid on the wellbore scale. In some implementations, the specified time duration is at least one hour. In some implementations, the method comprises widening the generated fractures in the wellbore scale in response to generating vibrations in the sand of the treatment fluid.

As used in this disclosure, the terms "a," "an," or "the" are used to include one or more than one unless the context clearly dictates otherwise. The term "or" is used to refer to a nonexclusive "or" unless otherwise indicated. The statement "at least one of A and B" has the same meaning as "A, B, or A and B." In addition, it is to be understood that the phraseology or terminology employed in this disclosure, and not otherwise defined, is for the purpose of description only and not of limitation. Any use of section headings is intended to aid reading of the document and is not to be interpreted as limiting; information that is relevant to a section heading may occur within or outside of that particular section.

As used in this disclosure, the term "about" or "approximately" can allow for a degree of variability in a value or range, for example, within 10%, within 5%, or within 1% of a stated value or of a stated limit of a range.

As used in this disclosure, "weight percent" (wt %) can be considered a mass fraction or a mass ratio of a substance to the total mixture or composition. Weight percent can be a weight-to-weight ratio or mass-to-mass ratio, unless indicated otherwise.

As used in this disclosure, the term "substantially" refers to a majority of, or mostly, as in at least about 50%, 60%, 70%, 80%, 90%, 95%, 96%, 97%, 98%, 99%, 99.5%, 99.9%, 99.99%, or at least about 99.999% or more.

Values expressed in a range format should be interpreted in a flexible manner to include not only the numerical values explicitly recited as the limits of the range, but also to include all the individual numerical values or sub-ranges encompassed within that range as if each numerical value and sub-range is explicitly recited. For example, a range of "0.1% to about 5%" or "0.1% to 5%" should be interpreted to include about 0.1% to about 5%, as well as the individual values (for example, 1%, 2%, 3%, and 4%) and the sub-ranges (for example, 0.1% to 0.5%, 1.1% to 2.2%, 3.3% to 4.4%) within the indicated range. The statement "X to Y" has the same meaning as "about X to about Y," unless indicated otherwise. Likewise, the statement "X, Y, or Z" has the same meaning as "about X, about Y, or about Z," unless indicated otherwise.

While this specification contains many specific implementation details, these should not be construed as limitations on the scope of what may be claimed, but rather as descriptions of features that may be specific to particular implementations. Certain features that are described in this specification in the context of separate implementations can also be implemented, in combination, in a single implementation. Conversely, various features that are described in the context of a single implementation can also be implemented in multiple implementations, separately, or in any sub-combination. Moreover, although previously described features may be described as acting in certain combinations and even initially claimed as such, one or more features from a claimed combination can, in some cases, be excised from the combination, and the claimed combination may be directed to a sub-combination or variation of a sub-combination.

What is claimed is:

1. A method comprising:

flowing a treatment fluid into a wellbore formed in a subterranean formation, the treatment fluid comprising sand and a chemical dissolver configured to react with and dissolve wellbore scale;

generating ultrasound energy within the wellbore;

applying the generated ultrasound energy to the treatment fluid, wherein applying the generated ultrasound energy generates cavitation in the treatment fluid to facilitate dislodging of the wellbore scale, wherein applying the generated ultrasound energy generates vibrations in the sand of the treatment fluid flowed into the wellbore, wherein the vibrations in the sand facilitate abrasive and dislodging action on the wellbore scale; and contacting the chemical dissolver with the wellbore scale for a specified time duration causing the chemical dissolver to react with and dissolve the wellbore scale within the wellbore, wherein the chemical dissolver comprises a chelating agent comprising ethylenediamine tetraacetic acid.

2. The method of claim 1, wherein prior to flowing the treatment fluid into the wellbore, the wellbore scale is disposed on a surface of a tubular disposed within the wellbore, and the wellbore scale is removed from the surface of the tubular in response to flowing the treatment fluid into the wellbore, generating the ultrasound energy, applying the generated ultrasound energy to the treatment fluid, and contacting the chemical dissolver with the wellbore scale.

3. The method of claim 1, wherein the generated ultrasound energy has a frequency in a range from about 20 kilohertz (kHz) to about 40 kilohertz (kHz) to generate the cavitation in the treatment fluid.

4. The method of claim 3, comprising generating fractures in the wellbore scale in response to generating the cavitation in the treatment fluid to increase an exposed surface area of the wellbore scale.

5. The method of claim 4, comprising flowing the sand into the generated fractures in the wellbore scale to hold open the generated fractures and facilitate contact of the chemical dissolver with the wellbore scale.

6. The method of claim 5, comprising widening the generated fractures in the wellbore scale in response to generating vibrations in the sand of the treatment fluid.

7. The method of claim 1, wherein the chemical dissolver further comprises an inorganic compound.

8. The method of claim 7, wherein the inorganic compound comprises potassium carbonate.

9. A system comprising:

a treatment fluid comprising sand and a chemical dissolver configured to react with and dissolve wellbore scale, wherein the chemical dissolver comprises a chelating agent comprising ethylenediamine tetraacetic acid;

a pump configured to flow the treatment fluid into a wellbore formed in a subterranean formation; and an ultrasonic probe configured to generate ultrasound energy within the wellbore to generate cavitation in the treatment fluid to facilitate dislodging action on the wellbore scale and to generate vibrations in the sand of the treatment fluid to provide abrasive and dislodging action on the wellbore scale.

10. The system of claim 9, comprising a tubular disposed within a wellbore, wherein the wellbore scale is disposed on a surface of the tubular, wherein the treatment fluid and the ultrasonic probe are cooperatively configured to remove the wellbore scale from the surface of the tubular.

11. The system of claim 9, wherein the ultrasonic probe is configured to generate the ultrasound energy at a specified frequency that generates cavitation in the treatment fluid, and the specified frequency is in a range from about 20 kilohertz (kHz) to about 40 kilohertz (kHz).

12. The system of claim 9, wherein the chemical dissolver further comprises potassium carbonate.

13. The system of claim 9, wherein the sand is sized to hold open fractures within the wellbore scale for facilitating contact of the chemical dissolver with the wellbore scale.

14. A method comprising:

flowing a treatment fluid into a wellbore formed in a subterranean formation, the treatment fluid comprising sand and ethylenediamine tetraacetic acid configured to react with and dissolve wellbore scale;

generating ultrasound energy within the wellbore;

generating cavitation in the treatment fluid in response to generating the ultrasound energy within the wellbore to facilitate generation of fractures in the wellbore scale and dislodging the wellbore scale;

generating vibrations in the sand of the treatment fluid in response to generating the ultrasound energy within the wellbore to facilitate abrasive and dislodging action on the wellbore scale;

flowing the sand into the generated fractures in the wellbore scale to hold open the generated fractures and increase an exposed surface area of the wellbore scale to facilitate contact of the ethylenediamine tetraacetic acid with the wellbore scale; and contacting the ethylenediamine tetraacetic acid with the wellbore scale for a specified time duration causing the ethylenediamine tetraacetic acid to react with and dissolve the wellbore scale within the wellbore.

15. The method of claim 14, wherein the ultrasound energy is generated at a specified frequency in a range from about 20 kilohertz (kHz) to about 40 kilohertz (kHz) that generates the cavitation in the treatment fluid to facilitate the abrasive and dislodging action of the treatment fluid on the wellbore scale.

16. The method of claim 15, wherein the specified time duration is at least one hour.

17. The method of claim 16, comprising widening the generated fractures in the wellbore scale in response to generating vibrations in the sand of the treatment fluid.

* * * * *